United States Patent [19]

Rochester, Jr.

[11] 3,844,601

[45] Oct. 29, 1974

[54] CHOKER KNOB FOR LOGGING CABLES AND METHOD OF MAKING SAME

[76] Inventor: William L. Rochester, Jr., P.O. Box 322, Aberdeen, N.C. 28315

[22] Filed: Jan. 19, 1972

[21] Appl. No.: 219,190

Related U.S. Application Data

[62] Division of Ser. No. 845,829, July 29, 1969, abandoned.

[52] U.S. Cl............ 294/78 R, 24/114.5, 24/115 A, 24/115 R, 294/74, 403/206
[51] Int. Cl........................ B66c 1/34, F16g 11/02
[58] Field of Search... 24/123 W, 114.5, 124, 122.6, 24/115 A, 115 R; 403/343, 206, 215; 294/74, 78 R

[56] References Cited
UNITED STATES PATENTS

| | | | |
|---|---|---|---|
| 650,860 | 6/1900 | McTighe | 24/123 W |
| 895,065 | 8/1908 | Boulter | 24/124 |
| 1,643,150 | 9/1927 | Conner | 24/115 A |
| 1,756,973 | 5/1930 | Conner | 403/343 |
| 2,446,542 | 8/1948 | MacInnes | 24/123 N |
| 2,795,442 | 6/1957 | Wilson | 24/123 W |
| 3,570,074 | 3/1971 | Schimmeyer et al. | 24/122.6 |

*Primary Examiner*—Bobby R. Gay
*Assistant Examiner*—Kenneth J. Dorner

[57] ABSTRACT

An enlarged end for a wire cable is formed by swaging a sleeve on the end of the cable to intimately connect the sleeve to the cable by causing the metal to flow into the spaces between the cable wires to such an extent that the wires themselves become more intimately joined to each other, and the sleeve is threaded to receive a reciprocally threaded ferrule and/or nut which forms the knob for detachable connection with a choker hook.

9 Claims, 9 Drawing Figures

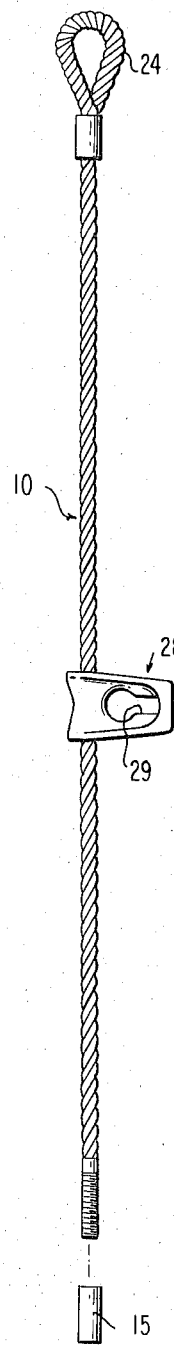
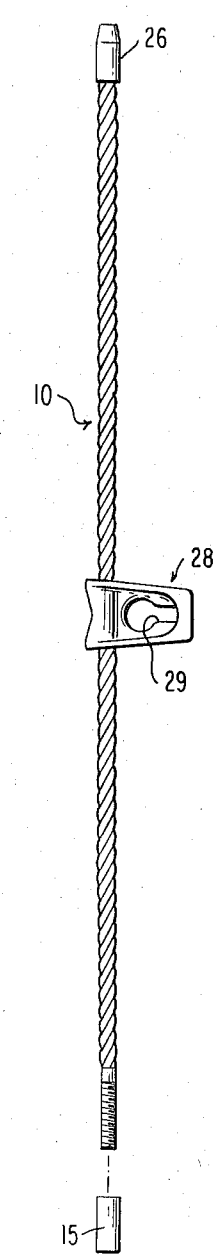
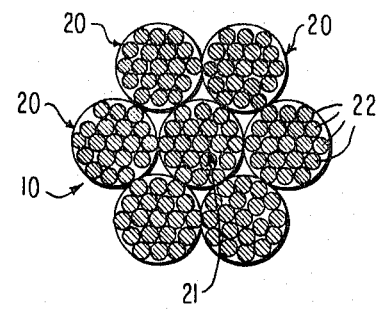
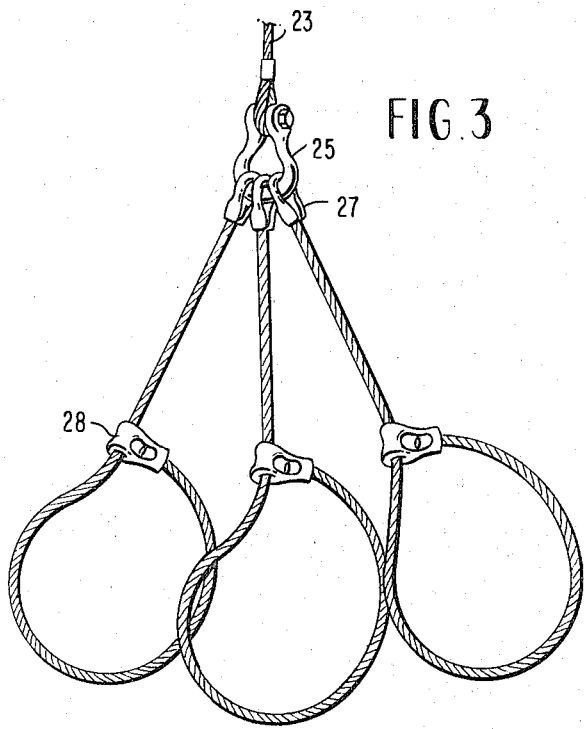

CHOKER KNOB FOR LOGGING CABLES AND METHOD OF MAKING SAME

This application is a division of our earlier copending application, Ser. No. 845,829, filed July 29, 1969, entitled "Choker Knob for Logging Cables and Method of Making Same" now abandoned.

This invention relates to logging cables and more particularly to installing a choker knob on the end of a cable for detachably connecting the end of the cable to a fitting known as a choker hook, which is slidable on the main portion of the cable wherein the end of the cable may be brought around the end of a tree, or log, to form a loop having a slipping connection which will grip the log to enable it to be dragged along the ground.

Such connections form an enlargement, or knob, at the end of the cable and, due to the fact that repeated tightening of the cable when the slack is taken up causes the knob to exert sudden bending stresses in the cable, which frequently causes failure in the cable.

It is therefore an object of this invention to provide a choker knob capable of a more extended period of use than previously known fittings of this type and which is capable of easy fabrication and assembly in the field at relatively little cost.

Accordingly, a preferred form of the invention is disclosed in the foregoing specification together with the annexed drawings in which:

FIG. 1 is a plan view of conventional choker cable provided with a convention slidable choker hook, with the lower end of the cable being fitted with a choker knob according to the present invention;

FIG. 2 is a cross-section of a conventional seven-strand wire rope;

FIG. 3 is a perspective view of choker cable similar to FIG. 1 but with a conventional choker knob attached at the upper end;

Figure 5:
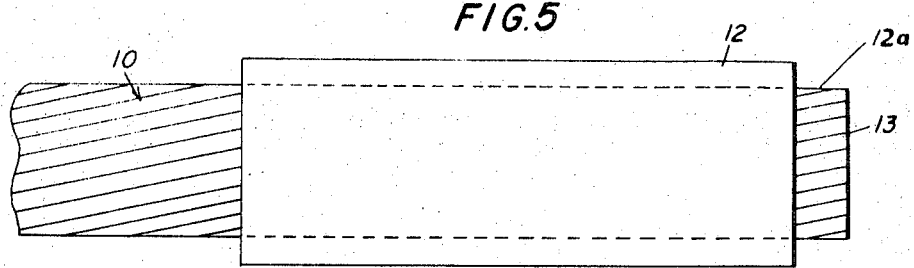
FIG. 5 is a side elevation of the end of a choker cable at a preliminary stage in the fabrication of a knob in accordance with the teachings of this invention.

In the drawings the numeral 10 indicates generally a steel wire cable of conventional manufacture, such as a seven-strand wire rope such as is normally used in logging operations, in which each of the strands is made up of a plurality of wires twisted together helically to form the individual strands, in turn, being laid around a seventh strand which forms a core.

FIG. 1 of the drawings illustrates a typical form of choker cable such as has been in common use in the logging industry for the removal of a felled tree from the forest for further operations at a sawmill As stated above, the wire rope 10 usually comprises a metal cable formed from six helically wound strands 20, surrounding a core strand 21, as shown in FIG. 2. The outer strands comprise bundles of metal wires 22 and, while the core strand 21 usually is formed of metal wires, occasionally the core strand may be composed of fibrous non-metallic materials in the interests of economy.

Furthermore one, or more, choker cables are commonly connected at one of their ends to a long winch line, such as indicated by numeral 23 in FIG. 3, which in turn is attached to the winch of a hauling tractor (not shown). Several methods for accomplishing this are employed, one of which involves the provision of an eye-splice 24 at one end of a choker cable so that several cables can be attached to the end of a winch line by means of a shackle 25.

Another common means for attaching the choker cable is to attach an enlarged knob, or ferrule 26, to the end of the cable by swaging, as illustrated in FIG. 4. In this case the ferrules are attached to the shackle 25 by means of basket hooks 27, as seen in FIG. 3.

A conventional choker also includes a choker hook 28 which comprises a somewhat elongated metal casting having a transverse passage at one end which allows it to slide along the length of the cable 10. Finally, in the prior art, a choker cable will be provided at its other end with a knob, or ferrule, similar to the knob 26 which has been swaged in place on the cable. It is this latter knob which, when the cable 10 has been pulled around the trunk of a tree, will be inserted into the slotted lengthwise opening 29 in one side of the hook 28, as seen in FIG. 3, prior to exerting force by the winch line 23. Obviously, when the slack is taken up by the hauling tractor, each of the choker hooks will slide along their respective cables until the size of the respective loops of cable adjusts to the thickness of its encircled tree trunk.

In order to prevent loss of the choker hook 28 when the choker cable is stored, or being dragged along the ground during the return trip from the sawmill to the forest, it is essential that the diameter of the choker knob at the free end of the cable be sufficiently large to prevent its passage through the transverse passage in the hook. For this reason the practice has been to fabricate choker cables in complete sets, with a length of wire rope having a heavy choker knob swaged in place at one, or both, ends at a factory having the necessary equipment to do so, with the slidable choker hook captured between the two ends of the cable.

Due to the extremely rough service to which the choker knobs are subject, the failure of the cable usually takes place at a location adjacent the choker knob and when this occurs the entire choker cable and choker hook must be discarded. The hook itself can usually be salvaged but, in the prior practice, the equipment has not been available to fabricate a new choker cable in the field due to lack of equipment for swaging the choker knob in place, so that over a period of time the logger will accumulate a large number of excess choker hooks.

All of the foregoing is well known in the prior art, and forms no part of the applicant's invention. The applicant's invention consists in the provision of an improved ferrule, indicated by numeral 15 in FIGS. 1 and 4, which can be substituted for a conventional ferrule 26 at either, or both, end of the choker cable.

Briefly described, the invention consists in applying a thin sleeve on the end of the cable by means of a swaging die, which sleeve is then threaded. After this is done, the threaded sleeve can be passed through the transverse passage in the choker hook, and the enlarged knob can be threaded on the sleeve.

Figure 6:
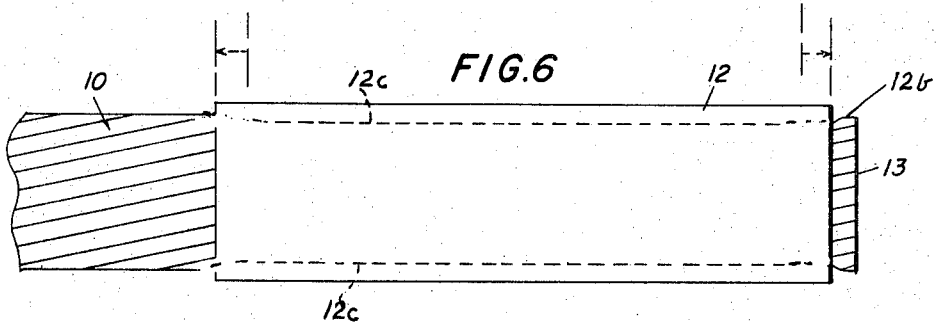
FIGS. 6 and 7 show later stages of fabrication.
Figure 7:
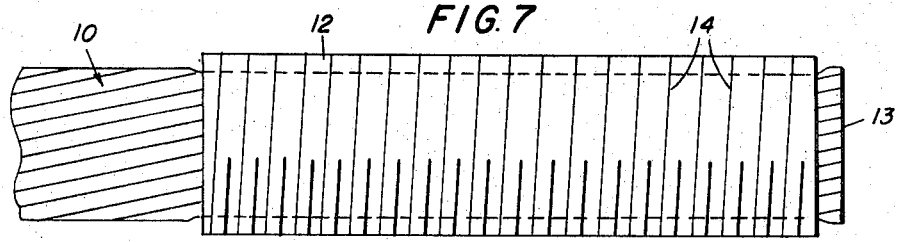
Figure 8:
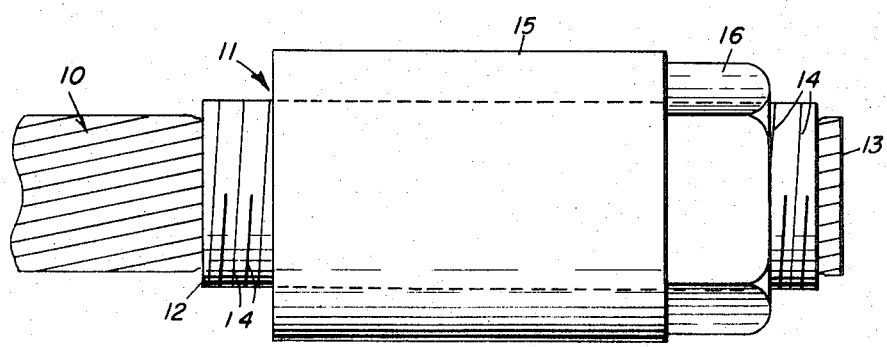
FIG. 8 shows a preferred form of completed knob.

The first step is to provide a steel sleeve 12 which has a normal inside diameter closely approximating the mean outside diameter of the cable - one that will permit the sleeve to be slid on to encircle the cable, leaving a short length of the terminal end of the cable 12a projecting outwardly from one end of the sleeve. With the sleeve in place pressure is applied on the exterior thereof in radially inward directions, such as by the employment of a swaging die, to compress the sleeve, and also to compress and deform the wire strands of the cable beneath the sleeve, as shown in FIG. 6. As a result, a flow of metal will take place in the sleeve, causing the sleeve to become reduced in diameter and to extend in length to some extent in both axial directions, as indicated by the arrows between the two figures and also by the fact that the sleeve will extend further along the exposed extremity 12b of the cable. In addition, the metal in the inner portion of the sleeve will flow between the individual wires of the cable causing the sleeve to become firmly attached thereto. Also, a certain proportion of the external pressure will penetrate to the cable itself causing the surface wires at least to become embedded and deformed into the wires immediately below the surface; this effect being most noticeable along the major portion of the length of the sleeve and tapering off at both ends, as indicated by the dotted lines 12c, whereby the exposed end 13 assumes a somewhat conical form to further assist in holding the sleeve in place.

After the sleeve has been secured to the cable, the exterior surface is provided with helical threads 14 along its length and a heavy cylindrical ferrule 15 can be threaded on to the sleeve to serve as a knob when the cable end is placed in a choker fitting. As a means for holding the ferrule in place, a lock nut 16 can also be threaded on to the sleeve and drawn up tight against the ferrule. On the other hand, since the purpose of the invention is to provide an enlargement at the end of a cable to be engaged by the two fingers of a choker hook, it will be obvious that, if a cylindrical sleeve is not readily available, two or more lock nuts 16 can be threaded on to the sleeve 12 to serve in place of the ferrule 15. Additionally the threaded sleeve 12 also serves as a connector which can be used to attach other types of fittings, such as a hook, or a ring, etc., provided with the proper internally threaded bore to enable the fitting to be screwed on to the sleeve.

As an example of one form of device, although not to be considered as limited thereto, a steel seven-strand cable having a normal overall diameter of nineteen thirty-seconds inches was provided with an annealed mild steel sleeve having an unstressed length of 2 ¼ inches with an inside diameter of five-eighths inch and an outside diameter of three-fourths inch. The sleeve and cable were then placed in a two-part cylindrical die and subjected to compression in a press having a force of between 100 and 200 tons. After compression the sleeve had expanded to about 2 ½ inches and the outside diameter was reduced to about twenty thirty-seconds inch with the cable itself undergoing a corresponding reduction in overall diameter.

Figure 9:
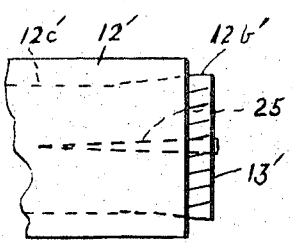
FIG. 9 is a fragmentary view of a modified form at the stage of fabrication equivalent to FIG. 6.

In FIG. 9 there is shown a modified form of the invention, in which the cable is a seven strand cable. Before the cable and sleeve 12' are compressed, however, a tapered metal plug 25 is driven into the center of the core strand from the exposed end 13'; so that when the pressure is applied, there will be a tendency for the formation of a somewhat more pronounced conical taper to be produced at the end of the cable, as indicated by dotted lines 12c' and the solid line 12g'.

I claim:

1. In a choker cable of the type wherein a length of wire rope comprising seven strands, each strand comprising a plurality of helically wound steel wires is provided with a choker hook which is slidable along the length of the cable and the ends of the wire rope terminate in a pair of enlarged elements to prevent detachment of the slidable hook, said choker hook being of the type which includes a body portion extending radially away from the wire rope, said body portion terminating at its outer end in fingers for partially encircling one end of the wire rope extending radially outwardly in alignment with the body portion, said fingers also partially encircling one of said enlarged elements for preventing removal of the wire rope from the recess in said radial direction, said body portion also being provided with an enlarged medially disposed transverse opening for the insertion and removal of the enlarged element and end of the wire rope when disposed in a transverse direction, the improvement which comprises a thin sleeve of ductile mild steel radially inwardly swaged in place and surrounding one terminal portion of said wire rope, substantially the entire length of the exterior surface of said sleeve being threaded to receive a choker ferrule, the outside radial dimension of said swaged and threaded sleeve being about 5 percent greater than that of the remainder of the wire rope to enable the insertion of a slidable choker hook onto said wire rope over said sleeve, that portion of the wire rope within said sleeve being radially inwardly deformed and the inner surface of said sleeve being in intimate contact with the exterior surfaces of said wire rope, and an elongated heavy choker ferrule provided with an internally threaded bore engaged with and encircling and confining in place substantially the entire length of said sleeve to provide one of said enlarged elements preventing removal of the inserted hook from one terminal portion of the wire rope.

2. The invention defined in claim 1, wherein the mean diameter of the central portion of the wire rope encircled by said sleeve is less than the mean diameter of the remainder of the rope, said diameter increasing in both axial directions toward the opposite ends of the sleeve.

3. The invention defined in claim 1, wherein a portion of the terminal end of the wire rope extends beyond the end of the sleeve adjacent said terminal end.

4. The invention defined in claim 1, wherein the other end of the wire rope includes means for attaching the other end of the rope to another wire cable.

5. The invention defined in claim 1, wherein said threaded member includes a cylindrical choker ferrule.

6. The invention defined in claim 1, wherein said threaded member also includes a lock nut for the ferrule.

7. The invention defined in claim 2, wherein said wire rope terminates adjacent to one end of said sleeve, and said one end includes a tapered metal plug disposed in a central portion of the wire rope and extending inwardly at least partially within said sleeve.

8. The invention defined in claim 1, wherein said sleeve of mild steel comprises prior to said deformation a cylindrical element having an inside diameter for a sliding fit over an undeformed section of said wire rope.

9. The invention defined in claim 8, wherein the deformation of said sleeve and wire rope is the result of compression in a die.

* * * * *